United States Patent [19]

Morton

[11] 4,115,803
[45] Sep. 19, 1978

[54] IMAGE ANALYSIS MEASUREMENT APPARATUS AND METHODS

[75] Inventor: Roger R. A. Morton, Penfield, N.Y.

[73] Assignee: Bausch & Lomb Incorporated, Rochester, N.Y.

[21] Appl. No.: 580,439

[22] Filed: May 23, 1975

[51] Int. Cl.$^2$ .............................................. H04N 7/18
[52] U.S. Cl. ............................... 358/107; 235/92 PC; 364/515
[58] Field of Search .................... 178/6, 6.8, DIG. 22, 178/DIG. 36, DIG. 37; 340/146.3 AC, 146.3 AE; 235/92 PC; 358/107; 364/515

[56] References Cited

U.S. PATENT DOCUMENTS

| | | | |
|---|---|---|---|
| 2,791,695 | 5/1957 | Bareford | 235/92 PC |
| 3,390,229 | 6/1968 | Williams | 178/DIG. 36 |
| 3,619,494 | 11/1971 | Fisher | 178/6.8 |
| 3,624,604 | 11/1971 | Gibbard | 340/146.3 AC |
| 3,751,585 | 8/1973 | Fisher | 178/6.8 |
| 3,946,361 | 3/1976 | Cruttwell | 340/146.3 AC |

Primary Examiner—Howard W. Britton
Attorney, Agent, or Firm—Bernard D. Bogdon; Frank C. Parker

[57] ABSTRACT

An image analysis measurement system is capable of performing a variety of measurements on single features within a field of scan or independently on multiple features within the field. The system provides direct determination of measurements across multiple features in the field for specific parameters. The measurements include, for example, projected length in any direction, perimeter, Feret's diameter in any direction, longest dimension, convex perimeter, and breadth.

16 Claims, 11 Drawing Figures

IMAGE ANALYSIS MEASUREMENT APPARATUS AND METHODS

CROSS REFERENCE TO RELATED APPLICATIONS

This application is cross referenced to and supported by concurrently filed and copending patent applications entitled (a) Image Analysis Data Transfer, Ser. No. 580,438 for inventor R. R. A. Morton; (b) Image Analysis Data Extraction, Ser. No. 580,392 for inventor R. R. A. Morton et al; and (c) Image Analysis Indexing Apparatus and Methods, Ser. No. 580,393 for inventor R. R. A. Morton.

BACKGROUND OF THE INVENTION

1. Field of the Invention:

This invention relates to an image analysis system for performing a variety of measurements and more specifically to an image analysis system for performing measurements on single or multiple features at any orientation in a field of view.

2. Description of the Prior Art:

In image analysis, it is necessary to extract geometric data from images having varied shape, size and light intensity, which data identifies a variety of materials or objects. This is done by using means, such as those outlined in U.S. Pat. No. 3,763,357, entitled "THRESHOLD CIRCUIT FOR CONVERTING A VIDEO SIGNAL TO A BINARY VIDEO SIGNAL" issued Oct. 2, 1973 for inventor Roger R. A. Morton, wherein a television camera scans the image to be measured and a threshold circuit defines the boundary of the image of an object by producing a signal containing information relating to scan line intercepts of the objects or features to be measured. A feature can comprise any object, cell, lake, island, or two or three dimensional objects which can be imaged onto a television camera to be ultimately measuring using image analysis techniques.

The basic processes of image analysis are to form images of specimens or objects to be measured. Such images will contain features having a gray value or light intensity different from their background. By scanning each image along parallel line scans, to produce a video signal whose amplitude is a function of the brightness or intensity of the image at each point along the parallel scan line, a video signal is produced. This vidio signal is then analyzed to determine the boundaries of features to be measured. The distance or segment of a scan line which intercepts the feature is termed, "an intercept". Thus, the end points of any intercept occur at the boundary of a feature. Obviously, any feature which subtends more than one line will have associated with it, a group of intercepts which taken as a whole for that feature, represents the boundaries of the feature.

The measurement of features is generally associated with determining geometric parameters such as area within for boundary, perimeter around the boundary, or longest dimension across the feature. In image analysis it is important to be able to perform a variety of different measurements on features depending on the specific feature whether it be, for example, a particle or a metallurgical inclusion. These different measurements relate to different physical properties of the feature. Furthermore, by combination of different measurements, shape factors, orientation factors, as well as derived measurements, may be extracted to more exactly describe the feature.

A number of techniques for performing measurements on features exist. Examples include the measurement of area on a selected feature as outlined in U.S. Pat. No. 3,805,028 entitled "METHODS OF AND APPARATUS FOR DETERMINING THE QUANTITY AND PHYSICAL PARAMETERS OF OBJECTS", issued Apr. 16, 1974 for inventor Roger R. A. Morton and the measurement of total area as outlined in U.S. Pat. No. 2,494,441 entitled "METHOD AND APPARATUS FOR ELECTRONICALLY DETERMINING PARTICLE SIZE AND DISTRIBUTION", issued Jan. 10, 1950 for inventor James Hillier. Measurement of longest dimension, as outlined in U.S. Pat. No. 3,805,028 entitled "METHODS OF AND APPARATUS FOR DETERMINING THE QUANTITY AND PHYSICAL PARAMETERS OF OBJECTS", issued Apr. 16, 1974 for inventor Roger R. A. Morton is also known. However, the technique outlined therein requires substantially more electronic circuitry when measuring, for example, tangent to tangent distances, or Feret's diameter at any precisely defined angles to the line of scan. The present invention is however able to perform Feret's diameter at any precisely defined angle. Patents, such as U.S. Pat. No. 3,244,810 have disclosed methods for obtaining the maximum chord of a feature or a chord in a given direction. These measurements are not geometrically the same as Feret's diameter or longest dimension.

In the present invention perimeter is defined as the total length of the boundary of a feature, including the length of the boundaries of the holes of the feature. Convex perimeter is the perimeter of the smallest convex region which escribes the feature being measured or, alternatively, it can be thought of as the distance required to wrap a piece of string one full revolution around the outside of a feature boundary. Feret's diameter, also termed tangent to tangent distance, is the distance between extreme parallel tangents to the feature, such distance being measured at an angle perpendicular to the tangents. When defined at a specific orientation, the Feret's diameter is defined by the angle of the distance between the parallel tangents, such angle being measured with respect to the horizontal direction.

Longest dimension is a maximum tangent to tangent distance, or maximum Feret's diameter determined over Feret's diameters measured at all orientations with respect to the feature.

Breadth is the minimum Feret's diameter or the minimum of all Feret's diameters measured at all orientations to the feature. It is the smallest distance between extreme parallel tangents to the feature regardless of orientation. Projected length corresponds to the Feret's diameter, plus the distance across any holes or reentrances in the direction that the Feret's diameter is being measured.

Previous patents, such as U.S. Pat. No. 3,216,311 entitled "NON-CONTACTING OBJECT MEASURING APPARATUS", issued Nov. 9, 1965 for inventors Robert J. Bibbero, Abraham Mann and Arnold K. H. Goldberger have disclosed techniques for determining the maximum distance subtended by a chord across a feature from parallel scan line intercept signals, by mechanically rotating the image. The chord is a measurement which differs geometrically from the measurements disclosed herein, and furthermore, techniques disclosed herein do not require the rotation of the image with respect to the scan direction.

U.S. Pat. No. 3,244,810 entitled "INTERCEPT SCANNING SYSTEM", issued Apr. 5, 1966 for inventor David A. Williams discloses techniques for measuring chords at predetermined orientations to the scan lines. However, the chord measurement is geometrically different from the distance between tangents. U.S. Pat. No. 3,740,468 entitled "FEATURE PARAMETER MEASUREMENT BY LINE SCANNING", issued June 19, 1973 for inventors Gerald M. Gardner, Saffron Walden and David W. Gibbard discloses a method for obtaining perimeter of a feature using an approximation technique involving extensive hardware.

SUMMARY OF THE INVENTION

The techniques described herein are to a large extent based on principles outlined in pending application Ser. No. 298,119 entitled "METHOD FOR MEASURING PARTICULATE SAMPLES" by Roger R. A. Morton. This application discloses techniques for measuring longest dimension, perimeter convex perimeter, and projected length in any direction on multiple features in a field of scan.

This invention relates to techniques for obtaining geometric dimensions of features or objects by processing the signals resulting from scanning the objects.

Techniques are disclosed for measuring perimeter, longest dimension, breadth, convex perimeter and projected length, and Feret's diameter at any orientation. The techniques outlined are applicable to fields of scan containing a single feature or to such fields containing many features, in which the intercepts relating to one of the features have been selected either manually or automatically, or simultaneous measurement of many features in a single field of scan.

The invention for measuring longest dimension comprises a technique for generating points across the field of scan. Associated with each point is a tangent value which is common to other points across the field of scan. Points having the same tangent value form a line termed tangent value line which makes a predetermined angle with the scan lines. Adjacent to each tangent value line of points having a constant tangent value is other tangent value lines of points lying parallel and equally spaced from the original line, arranged such that the tangent values of these lines of points increase with their perpendicular distance from the initial tangent value line of points. A feature to be measured is then interrogated to determine the tangent value line associated with its boundary which has the maximum value and the tangent value line associated with its boundary which has a minimum value. The difference of the values of these lines is related to the Feret's diameter or tangent-to-tangent distance across the feature at right angles to the tangent value lines of constant value.

The longest dimension measurment is obtained by arranging for the tangent value lines falling across the field of view to have successively different orientations with respect to the scan line and that at each orientation, the Feret's diameter for the feature be obtained. By performing the Feret's diameter measurement at a number of different orientations and obtaining the maximum Feret's diameter, the measurement of longest dimension is derived. Similarly, the measurement of breadth is obtained by determining the minimum of the Feret's diameters performed at various angles across the feature.

Convex perimeter is a new and novel measurement which has a number of interesting applications. For example, it permits, in conjunction with perimeter, the determination of whether a feature has any re-entrances because only convex features have a perimeter equal to a convex perimeter. For a non-convex feature or feature with re-entrances, the perimeter will be greater than the the convex perimeter. This measurement is also, a measure of the average caliper diameter, or Feret's diameter of a feature when divided by $\pi$, and is also very useful, instead of perimeter, to determine sizes of features where it is desired to know the boundary lengths, but to be able to discount any irregularities in the boundary, as not being relative to the physical characteristic of the features being measured.

Another useful application of convex perimeter, is the determination of the outside perimeter of convex features with holes in them, because convex perimeter permits the measurement of the outside boundaries of features, while not including the boundary length of any holes which may be in the feature. Convex perimeter is obtained by determining the average of the Feret's diameters of a feature over a number of orientations and multiplying the result by the numeral value of $\pi$ (3.1415926).

It may thus seem incongruous that the average Feret's diameter multiplied by $\pi$ corresponds to a perimeter of a convex feature or corresponds to the convex perimeter of a re-entrant feature. That this is in fact the case for all shapes can be appreciated by considering simple geometric shapes as specific examples. It can also be more easily appreciated if it is realized that the Feret's diameter, like convex perimeter, is unaffected by re-entrances of the feature being measured. However, mathematically and geometrically it can be proven that the identity applies to any shape.

The measurement of perimeter is obtained by performing an EXCLUSIVE OR operation between intercept information of the previous scan line and the intercept information of the current scan line. The length of the resulting pulses is then fed into a memory loaded with the function corresponding to the contribution of each of these segments to the perimeter of the feature. These contributions are then summed.

Projected length at any orientation is determined by a similar technique, whereby the pulse length data is fed into a memory loaded with the contributions of each of these segments to the projected length at a given orientation and a total projected length is determined from the summation. Perimeter may alternatively be determined by performing projected length measurements at different orientations determining the average and multiplying it by $\pi$

DESCRIPTION OF THE PREFERRED EMBODIMENT

Figure 1:
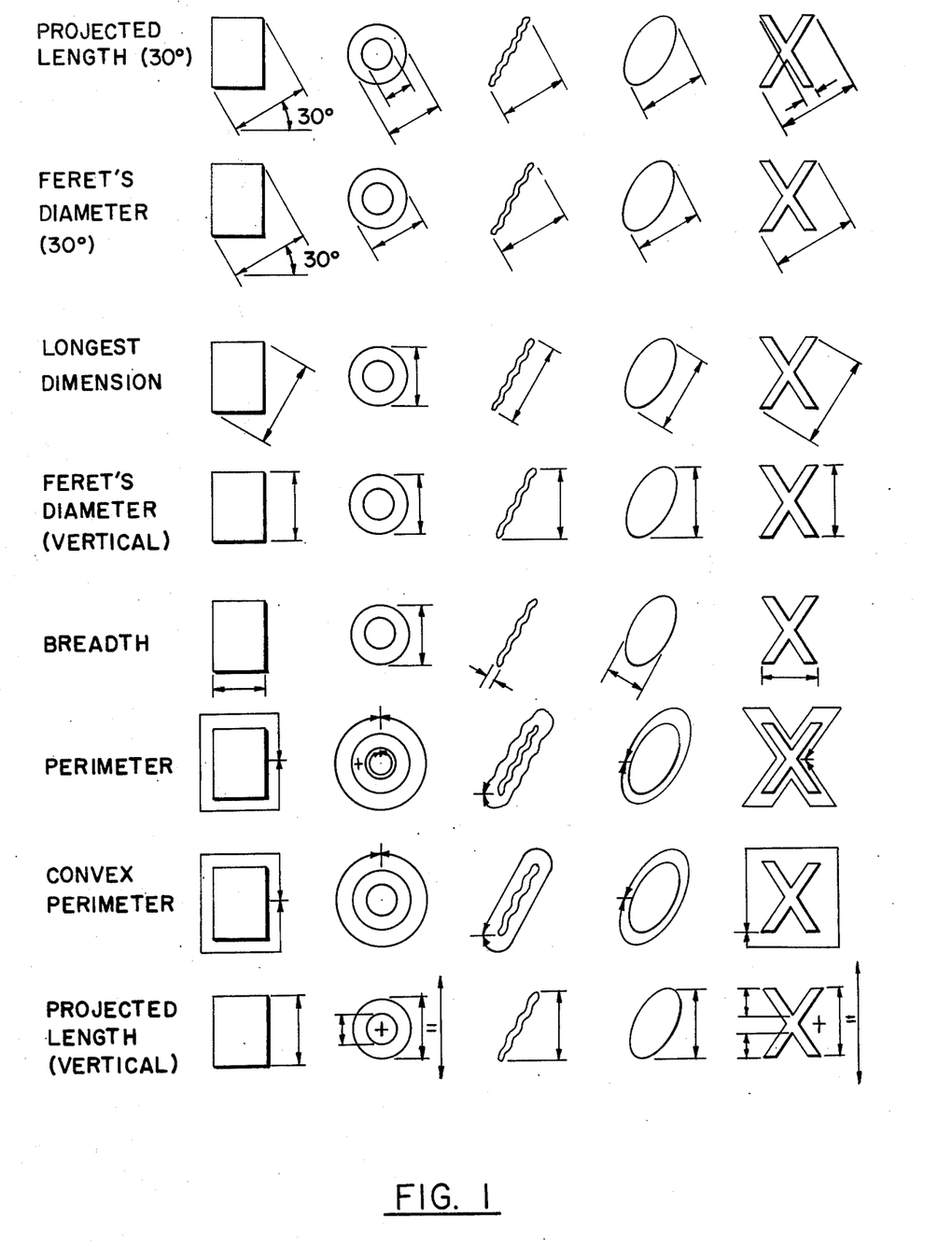
FIG. 1 illustrates the various measurements described herein exemplified on a range of shapes.

FIG. 1 shows the various measurements described herein for a range of feature shapes. Projected length and Fetet's measurements are showed for both the vertical direction, 90° to the horizontal, and at 30° to the horizontal.

Figure 2:
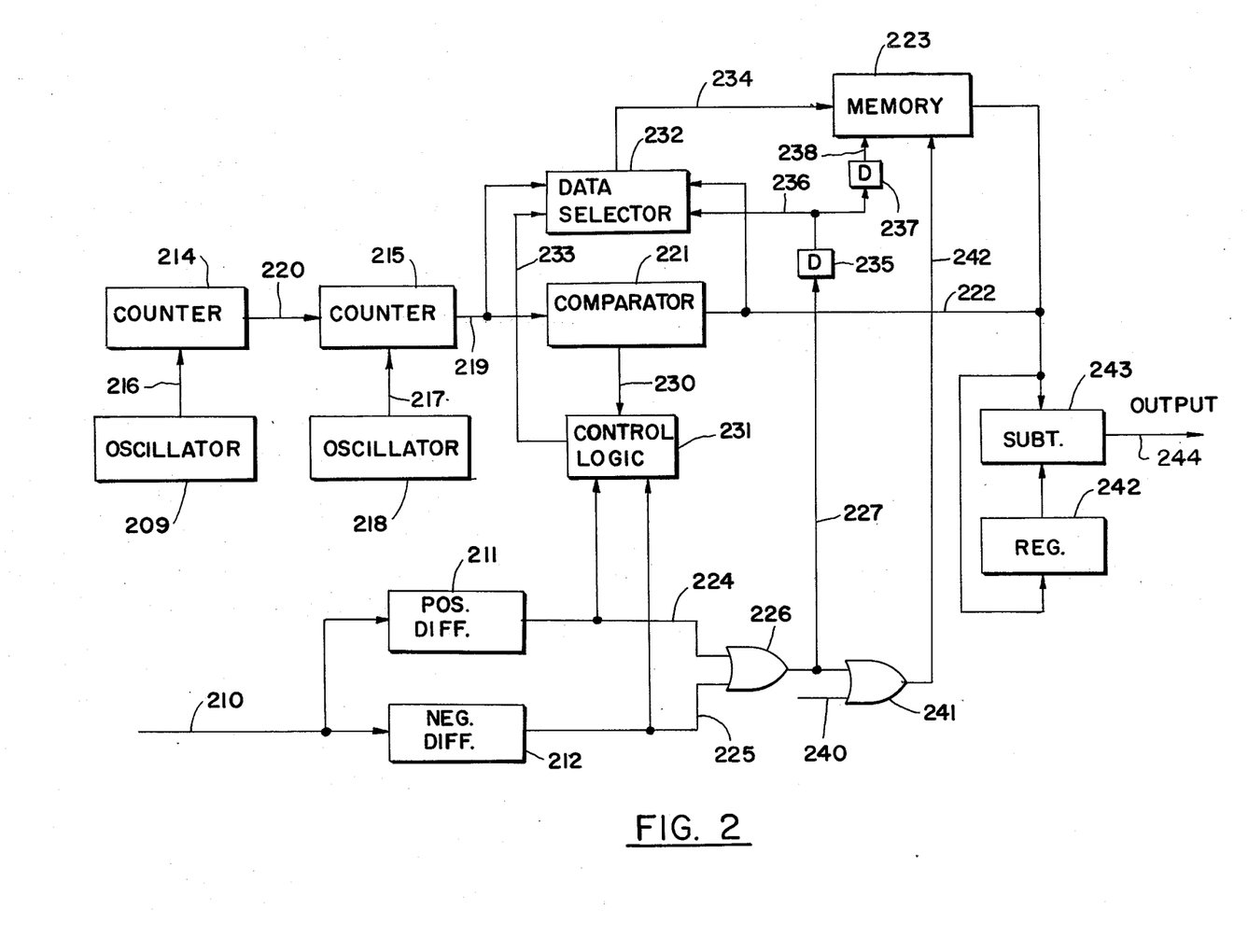
FIG. 2 illustrates a functional block circuit for determining Feret's diameter or tangent to tangent measurement.

FIG. 2 shows the functional blocks involved in determining Feret's diameter or tangent to tangent measurement. The intercept signal is derived using techniques, for example, similar to those disclosed in U.S. Pat. No. 3,805,028, entitled "METHOD OF AND APPARATUS FOR DETERMINING THE QUANTITY AND PHYSICAL PARAMETERS OF OBJECTS", issued Apr. 16, 1974 for inventor Roger R. A. Morton, where a television scanner is used to generate a video signal. The video signal is processed to produce signals corresponding to line scan intercepts of a feature. The intercept signal appearing on line 210 may represent all the intercepts in a field of view or it may represent the intercepts of a selected particle as disclosed in U.S. Pat. No. 3,805,028, for example, from selective particle measurement block 54 of FIG. 3 of the reference.

Figure 4:
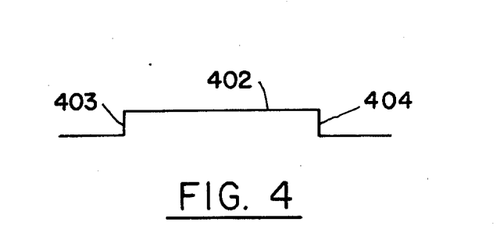
FIG. 4 illustrates the transitions of a pulse of a binary video signal representing an intercept.

These intercepts appearing on line 210 enter positive differentiator 211 which produces a short positive pulse in response to an upwards or positive transition of the intercept signal on line 210, for example, as illustrated by transition 403 on intercept 402 of FIG. 4. The intercept signal also enters negative differentiator 212 which produces a short positive pulse in response to a negative transition on line 210, for example, transition 404 illustrated in FIG. 4.

A counter 214 is incremented or decremented, depending on the direction of the Feret's diameter measurement with respect to the scan line direction, by pulses from a variable frequency oscillator 209 through line 216. Counter 214 is reset at the beginning of each field of scan. At the beginning of each line of scan, the contents of counter 214 is loaded into counter 215 where the transferred value is incremented through line 217 by clock pulses from variable frequency oscillator 218. Thus, at the output of counter 215 on line 219 there appears data representing values occurring at points determined by the position at which counter 215 increments, in response to pulses appearing on line 217 from oscillator 218. Successive scan lines will, in general, have points at which the data line from counter 215 has the same value as points of previous scan lines. If lines were to be drawn through these points defined by clock pulses having the same value, they would make an angle A with the scan line as illustrated, for example, in FIG. 3. These conceptual lines or contours are termed tangent value lines. Angle A is determined by the relative frequencies of oscillator 209 and oscillator 218. Similarly, the spacing between these lines is also determined by the frequencies of the two oscillators 209 and 218. The interconnection lines 220, 219, 222 and 234 of FIG. 2 are lines which may represent multiple lines carrying parallel data.

Figure 3:
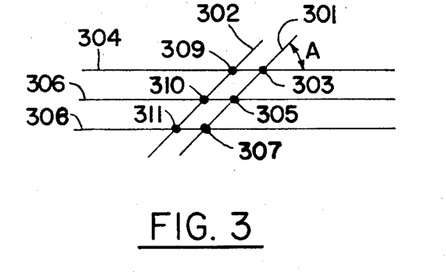
FIG. 3 illustrates exemplary tangent value lines formed by tangent value points occurring on scan lines.

In FIG. 3 the tangent value line 301 formed from intercept point 303 on scan line 304; point 305 on scan line 306; and point 307 on scan line 308, is defined by points at which counter 215 has the same value on each of the three scan lines. Similarly, points 309, 310 and 311 intercepting scan line 304, 306, 308, respectively, all have the same value along tangent line 302 which value is different from the value of tangent value line 301.

In order to minimize phase differences, which may be significant at certain values of angle A, counters 214 and 215 of FIG. 2 can be classified into counters comprising significant bits and lower order non-significant bits. The significant bits are outputted on line 219. Non-significant bits, that is bits which are transferred from counter 214 to counter 215 through line 220, serve to ensure that the points at which the significant bits of counter 215 increments, have a correct phase relationship, thereby minimizing the value of the quanitizing error of the digital process.

The output of counter 215 passes on line 219 to comparator 221 which compares the data coming on line 222 from memory 223. The output signal from memory 223 is triggered by the output of positive differentiator 211 or negative differentiator 212 on line 224 and line 225, respectively, and thereafter being combined in OR gate 226 to produce a single pulse on line 227. This pulse is fed directly into OR gate 241 and passes on line 242 to memory 223 to cause the reading of data from the memory 223, corresponding to the tangent value of the previous intercept of the feature. Should no previous intercept have occurred, a null condition is detected by comparator 221.

As counter 215 is incrementing, that is increasing in count across the scan line, comparator 221 determines whether the output 222 of memory 223 which results from the pulse arising from transition 403 of intercept 402 of FIG. 4, is greater than or less than the output on line 219 from counter 215. If the output of comparator 221 on line 230 indicates that the data from the memory 223 on line 222 is greater than the signal from counter 215 on line 219, then the control logic 231 signals the data selector 232 via line 233 to select the output of counter 215 on line 219 and pass it through line 234 to memory 223.

The strobe signal controlling the passage of data through data selector 232 is a delayed signal from line 227 passing through delay 235 and then on line 236 to the data selector 232. The pulse on 236 then passes through delay 237 and appears on input line 238 of memory 223 as a write command signal, and the memory 223 then stores the output of the data selector 232 in such a manner that it may be read out on the next scan line. If on the other hand, the tangent value on line 222 is smaller than that on line 219, than the data currently in the line is transferred via the data selector 232 to memory 223.

The memory 223 may comprise a random access memory, a shift register memory, or a dual first in/first out (FI/FO) memory with switchover from read to write at the end of each line scan, if multiple features per field of scan are to be measured. Alternatively, memory 223 may comprise means such as two registers for storing two words, if one feature is measured per field.

A similar sequence occurs on the falling transition, or the negative edge 404 of the intercept pulse 402 of FIG. 4. Tangent value data is read from memory 223, on command from line 227, through gate 241, and is passed on line 222 to comparator 221 where the output data from memory 223 is compared with the tangent value appearing on line 219 from the counter 215. If the data on line 222 is determined by the comparator 221 to be greater than the data on line 219, then a signal on line 230 to the control logic 231 causes the logic 281 to generate a signal to strobe through line 233 the signal data selector 232, to select the signal from the memory 223 via line 222 through line 234 on command of the signal on line 238. On the other hand, if the data value from the memory 223 is smaller than that from the counter 215, then comparator 221 generates a command which results in the contents of the counter 215 on line 219 to be transferred through data selector 232 to memory 223. Thus, by performing successive comparison operations, there appears in the memory 223 data relating to the extreme tangent line values from the counter 215, encountered at both the leading edge and trailing edge of the feature. This data may be released from memory using techniques described in U.S. Pat. No. 3,805,028 or described in concurrently filed and copending patent application Ser. No. 580,438 entitled, Image Analysis Data Transfer, for inventor Roger R. A. Morton.

A pulse appearing on line 240 passing to OR gate 241 commands the release of data. The pulse appearing on line 240 may either arise simply at the last line of scanning of a feature, as described in U.S. Pat. No. 3,805,028, or it may arise from the detection by the X and Y comparator, for example, comparator 126 of FIG. 1A or comparator 166 of FIG. 1B of the concurrently filed Image Analysis Data Transfer patent application and specifically, for example, the pulse on line 169 from comparator 166 of FIG. 1B of the referenced application. A single pulse on line 240 will result in the reading from memory 223 of the tangent values for one of the extremities of the feature and a subsequent pulse will result in the reading from memory on line 222 of the tangent value of the other extremity of the feature at the scan intercept. The first of this data, i.e. the tangent value for the first extremity, may be stored in register 242 and the subsequent extremity value may be presented to one side of the input to subtractor 243, while register 242 presents the first data. The resulting difference on line 244 from the subtractor 243 will correspond to the tangent to tangent measurement with an orientation determined by the direction of count of counter 214 and the frequencies of oscillators 209 and 218. Furthermore, by ensuring that the frequencies of oscillators 209 and 218 have the appropriate values, the tangent to tangent measurement data on line 244 will be scaled to be consistant regardless of the orientation at which the measurement was taken. In FIG. 2, lines 219, 220, 222 and 234 correspond to multiple parallel data paths.

The dimension of tangent to tangent, sometimes termed Feret's diameter, is determined at any predetermined orientation and is useful in itself in determining the overall diameter of a feature, or determining, in conjunction with other measurements, the direction in which an object or feature is oriented.

Figure 3A:
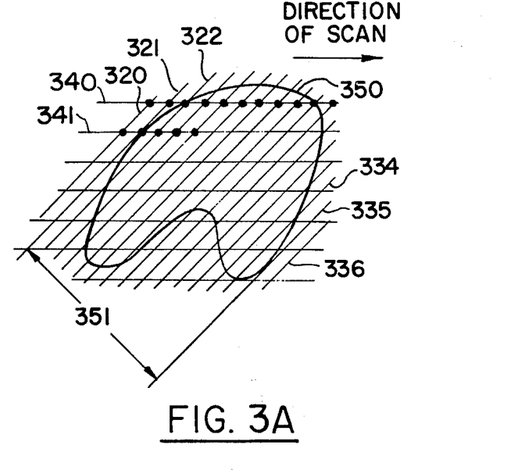
FIG. 3A illustrates exemplary tangent value lines superimposed over a feature being scanned.

FIG. 3A shows the position and interaction of the tangent value lines formed by points, along the scan lines, which have a constant value occurring as a result of the output of counter 215 and oriented at an arbitrary angle to the direction of the scan line. These equally spaced tangent value lines have values uniformly increasing from the lowest line on the left of the illustration marked 320, to the highest one on the right marked 336. Scan lines, for example, lines 340 and 341 intercept the feature shown whose boundary is designated 350.

The operation of apparatus, shown in FIG. 2, produces the result, with reference to FIG. 3A, that the minimum value tangent at the leading edge of the feature is tangent value line number 321, while the maximum value tangent at the trailing edge of the feature, is tangent value line number 335. The difference between the values of these lines corresponds to the tangent to tangent measurement and is in the direction at right angles to the tangent value lines. This dimension is shown diagrammatically as dimension 351.

Figure 5:
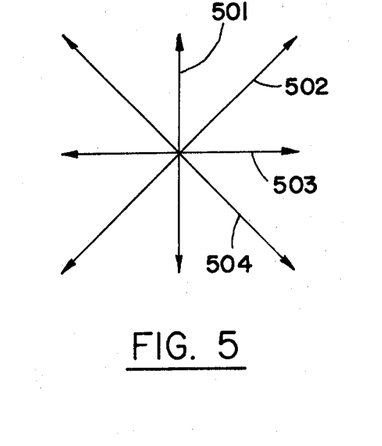
FIG. 5 illustrates the directions of tangent to tangent measurement employed in the preferred embodiment when deriving measurements based on four tangent to tangent measurements.

Another use for Feret's diameter, or tangent-to-tangent measurement, at predetermined orientations, is for determining the longest dimension measurement. The techniques disclosed in U.S. Pat. No. 3,805,028, for determining the longest dimension measurement from the tangent-to-tangent measurements performed in four equiangular orientations may be applied to the data on line 244. For example, measuring at the orientations designated by directional lines 501, 502, 503 and 504 shown in FIG. 5, and extracting the successive tangent to tangent measurements in each direction on line 224 of FIG. 2 to determine the maximum of the four measurements in the illustrated orientations, produces a result related to the longest dimension for a given feature.

The technique disclosed in U.S. Pat. No. 3,805,028 and shown in FIG. 6A hereof, includes the operation of a size counter 6032 which receives data corresponding to the tangent-to-tangent distance on line 244 from subtractor 243. The size counter 6032 connects through a size counter comparator 6047 which controls size counter transfer function 6033 through line 6046 to transfer data into the measurement counter 6034 on line 6045.

Figure 6A:
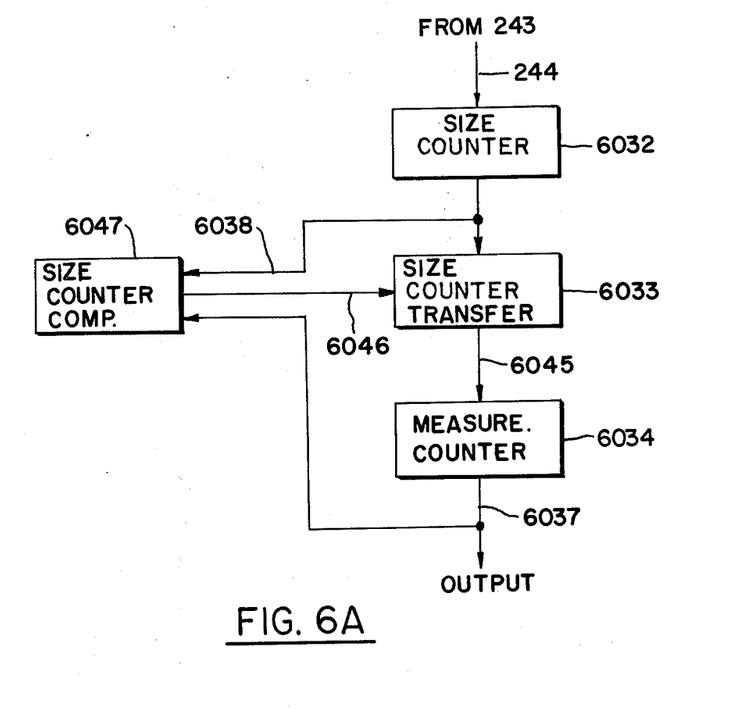
FIG. 6A illustrates a functional block circuit employed to determine longest dimension or perimeter from tangent to tangent measurements performed at various orientations.

Measurement counter 6034 is initially set to zero prior to the receipt of the first tangent to tangent measurement by size counter 6032. The size counter comparator 6047 detects if the value of the size counter signal through line 6038 is greater than or less than the value in the measurement counter 6034 entered through line 6037 in order to control the transfer through size counter transfer 6033. Consequently, if the signal value in the size counter 6032, corresponding to the last tangent to tangent measurement, is greater than that currently stored in the measurement counter 6034, the size counter comparator 6047 detects this and causes a transfer, through the size counter transfer 6033, of the greater value into the measurement counter 6034. At the conclusion of the series of measurements, the output of the measurement counter 6034 on line 6037, will correspond to the maximum tangent-to-tangent measurement, and therefore to the longest dimension for a given feature.

The breadth or minimum tangent-to-tangent measurement may be similarly determined. The breadth measurement requires that the tangent-to-tangent measurement be taken in a greater number of equally spaced directions than for longest dimension because of the sensitivity of the minimum measurement to orientation, especially for elongated features. Consequently, tangent-to-tangent measurements are taken in 16 or 32 equiangular directions. The same circuitry as shown in FIG. 6A and hereinbefore described, extracts the minimum measurement for a given feature by ensuring that a transfer only occurs when the size counter comparator 6047 detects that the size counter 6032 has a value smaller than that in the measurement counter 6034. Consequently, at the conclusion of the measurement the value of the smallest tangent-to-tangent measurement performed is resident in the measurement counter 6034, for the given feature.

Before the first tangent-to-tangent measurement is performed, it is necessary that the measurement counter 6034 be preset to an arbitrary high value. If it is set to zero, unless provision is made to ensure that the initial tangent-to-tangent measurement is always transferred into the measurement counter 6034, zero will be the final result.

A further measurement termed convex perimeter can be derived from tangent-to-tangent measurements made at various orientations. It is determined by summing the measurements of tangent-to-tangent over a number of equiangular directions and obtaining the average measurement by dividing by the number of directions averaged and then multiplying the result by $\pi$. These functions are performed by using the functional blocks shown in FIG. 7.

Figure 7:
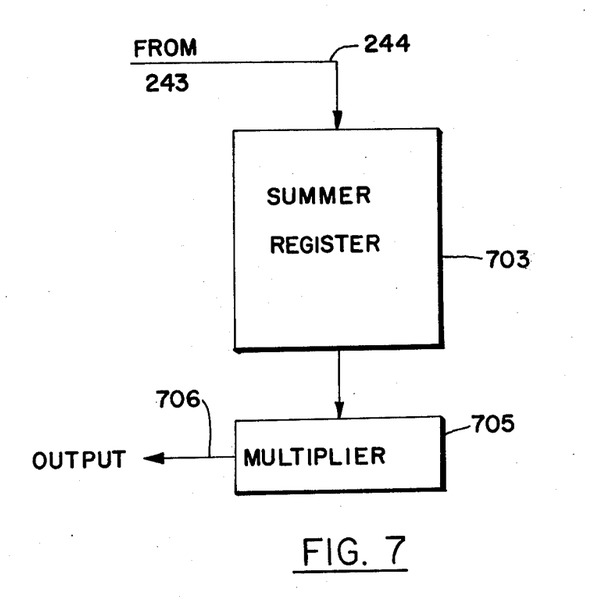
FIG. 7 shows a functional block diagram to obtain the measurements of convex perimeter from tangent to tangent measurements performed at various orientations.

The results of each tangent-to-tangent measurement at each orientation entered on line 244 are loaded into a summer/register combination 703 which accumulates and stores the summed result. Consequently, addition is performed on the successive tangent to tangent measurement signals entering on line 244. Thus, at the end of the series of measurements there resides at the output of the summer/register combination 703 the accumulated sum of the tangent to tangent measurements for a given feature. The value of the output of the summer register output 703 is then multiplied in multiplier 705 by the value of $\pi$ and divided by the number of directions over which the measurement was taken, thereby producing at the output of the multiplier 705, on line 706, the value of the convex perimeter of the feature.

Concurrently filed and copending patent application entitled, Image Analysis Indexing Apparatus and Methods for inventor Roger R. A. Morton discloses techniques for extracting index points from an initial field of scan. These index points are correlated to the feature from which they were derived and may correspond, for example, to transitions of the intercepts of the feature or topologically identified points of the feature.

Figure 6B:
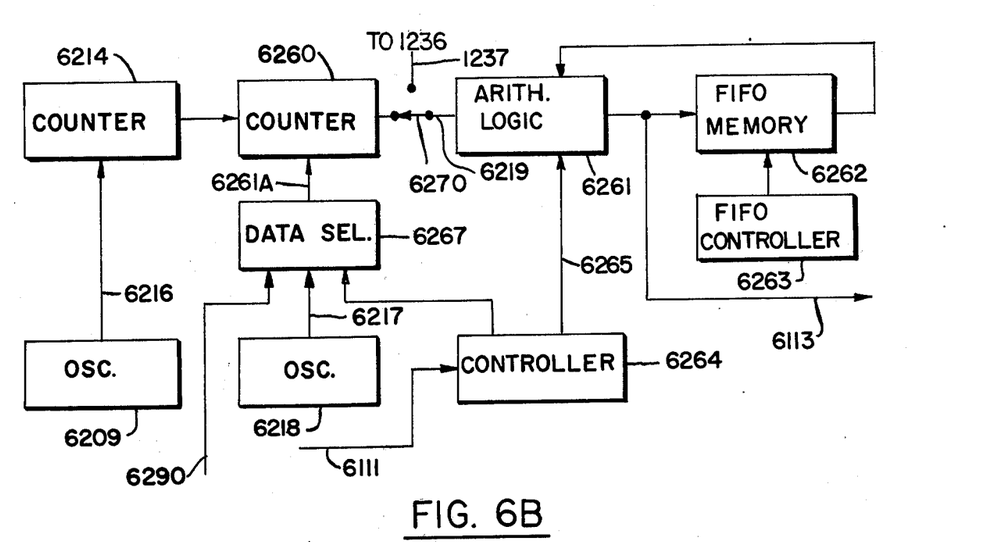
FIG. 6B illustrates an alternate method of determining tangent to tangent measurements performed at various orientations.

This last mentioned copending application illustrates in FIG. 1D, the implementation of the measurement logic block 110 of FIG. 1A of the copending application. This measurement logic implementation in FIG. 1D may be arranged to include counters equivalent to counter 214 and 215 of FIG. 2 of this disclosure, together with oscillator 209 and 218 of this disclosure. These items are shown in FIG. 6B of this disclosure as 6214, 6260, 6209 and 6218, respectively, to produce on line 6219 of FIG. 6B, a signal corresponding to the signal on line 219 of FIG. 2 hereof. The arithmetic logic unit 6261, the first in/first out (FI/FO) memory 6262, the FI/FO memory control 6263 and the controller 6264, all correspond to similar items 261, 262, 263 and 264 of FIG. 1D of the same last mentioned copending application.

The circuit shown in FIG. 6B of the present disclosure is capable of performing the same functions as are required of the circuit of copending application Image Analysis Indexing Apparatus and Methods in FIG. 1D and are enabled to do so by the data selector 6267 under control of controller 6264 which permits additional count inputs, such as those corresponding to the upper positive tangent count of the feature, to be substituted for the input from oscillator 6218 on line 6217. These additional inputs would enter on line 6290.

For the two techniques for using this apparatus for extracting tangent-to-tangent measurements, the first requires that during the initial field of scan positive and negative intercept transitions are defined as index points and passed into memory 115, of FIG. 1A of the last mentioned hereinbefore mentioned copending application.

To perform the function of tangent-to-tangent measurement using the implementation of FIG. 6B hereof, it is necessary that during a measurement field of scan, the controller 6264 causes, on each intercept transition, the data on line 6219, representing the tangent value, to appear on line 6113 for every intercept transition. Consequently, the data, appearing on line 6219 through switch 6270, is transferred, by the arithmetic logic unit 6261 under control of controller 6264, in response to the intercept information on line 6111, which is equivalent to that information on line 210 of FIG. 2 of this disclosure, to line 6113, corresponding to line 113 of FIG. 1A of the referenced copending application. All intercept transition tangent values appearing on line 6219 are passed ultimately into the memory 115, of FIG. 1A of the referenced copending application, entitled Image Analysis Indexing Apparatus and Methods, during the measurement field of scan. Thus, when operating in the measurement field of scan, the tangent value on line 6219, of FIG. 6B hereof, is passed through line 6113 to memory 115 of FIG. 1A of the last mentioned copending application. This tangent value is passed to such memory 115 together with indexing information, appearing on line 122 in FIG. 1A of the same copending application, relating the intercept at which the tangent value was obtained to the specific feature containing the intercept.

The measurement processing logic 130, in conjunction with memory 115 in FIG. 1A of the referenced copending application entitled Image Analysis Indexing Apparatus and Methods, may then perform the remaining functions equivalent to those already discussed with reference to FIG. 2 of this application. These functions are the comparison of the tangent values occurring at each intercept, to determine both the minimum tangent value of all leading edge intercepts belonging to a specific feature, and the maximum tangent values assigned to all trailing edge intercepts indexed to each specific feature in the field.

As already described, these functions were performed in FIG. 2 in part by comparator 221 in conjunction with memory 223. In a similar manner, memory 115 in conjunction with measurement processing logic 130 of FIG. 1A of the referenced copending application entitled Image Analysis Indexing Apparatus and Methods may also extract these maximum or minimum tangent values for every feature in the field of view and optionally output the values on line 140.

The extraction of the maximum or minimum tangent value for every feature in the field of view is performed by measurement processing logic 130 by reading locations stored in memory 115, both of FIG. 1A of the last mentioned copending application, to obtain the tangent values for one feature at a time basis. Those tangent values which have identifying numbers corresponding to a specific feature are then selected. By determining the maximum tangent value of the selected tangent values arising on the trailing edge of the specific feature and determining the minimum tangent value of those tangent values lying on the leading edge of the feature, the maximum or minimum tangent values for the specific features are determined. The process is then repeated for the next specific feature, and so on. Consequently, the maximum or minimum tangent values may be determined for every feature in the field.

In addition, memory 115 in conjunction with measurement processing logic 130 of FIG. 1A of last mentioned copending application, may determine the tangent-to-tangent measurement for each feature in the field by taking the maximum for each feature and subtracting from it, the minimum for that feature. In FIG. 2 these functions are performed by subtractor 243 and register 242.

Furthermore, the longest dimension of each feature in the field of view may be assessed using the same principles as were demonstrated in FIG. 6A. The memory 115 and measurement processing logic 130, as shown in FIG. 1A of concurrently filed application entitled Image Analysis Indexing Apparatus and Methods, operate in conjunction to determine tangent-to-tangent measurements at different orientations for each feature and then store the tangent-to-tangent data indexed on each feature. Then, by determining the maximum of these tangent-to-tangent measurements for each feature, the measurement processing logic 130 assesses the longest dimension of each feature. In the same manner, by determining the minimum, the breadth may be assessed. Finally, by determining the average value of the tangent to tangent measurements and multiplying by $\pi$, the convex perimeter of the individual features may be determined.

An alternative technique for using the measurement logic implementation shown in FIG. 6B hereof, in conjunction with the apparatus shown in FIG. 1A of the last mentioned copending application, requires that on an initial field of view, index points are generated corresponding to topological points of each feature in the field of view. The coordinates of these points are stored as index points with information correlating them to the specific feature from which they were derived. Subsequently, data extracted from the topological points corresponding to the maximum and minimum tangent values determined at trailing and leading edges for each particular feature. These maximum and minimum tangent values indexed to each topological point of each feature are transferred into memory 115 of FIG. 1A of copending Image Analysis Indexing Apparatus and Methods application and, in conjunction with measurement processing logic 130, will determine maximum and minimum tangent values from other index points of each feature. These sets of maximum values for each feature will be compared to determine a true maximum value for each feature. Likewise an overall minimum value is determined for each feature. The difference of these maximum and minimum values is then found, which will correspond to the tangent to tangent measurement of the feature.

Further details of the operation of the measurement logic in FIG. 6B are as follows. First an initial field of scan is performed to identify topological points and store their coordinates as index points. Next during a measurement field of scan, the FI/FO memory 6262 and arithmetic logic unit 6261, operating in conjunction with FI/FO memory control 6263 and controller 6264, are used to determine for each feature in the field of view the minimum tangent value of the leading edge intercepts of each feature and the maximum tangent value of the trailing edge intercepts of each feature. Controller 6264 causes the tangent value on 6219 at each intercept transition to be passed to arithmetic logic unit 6261 which compares the tangent value on line 6219 with the value representing the previous leading edge minimum tangent value for the specific feature from the previous scan line read from FI/FO memory 6262, to assess which one of the two values is the minimum and to store the minimum again in FI/FO memory 6262 for use on the next scan line. Controller 6264 is triggered from line 611 containing the binary video signal representing the intercepts of the features in the field of view.

Similarly, on each trailing edge of a feature, the controller 6264, through line 6265, causes arithmetic logic unit 6261 to compare through line 6265 tangent value data entering on line 6219 with the data from FI/FO memory 6262 to transfer the maximum into FI/FO 6262 for subsequent use.

Figure 9:
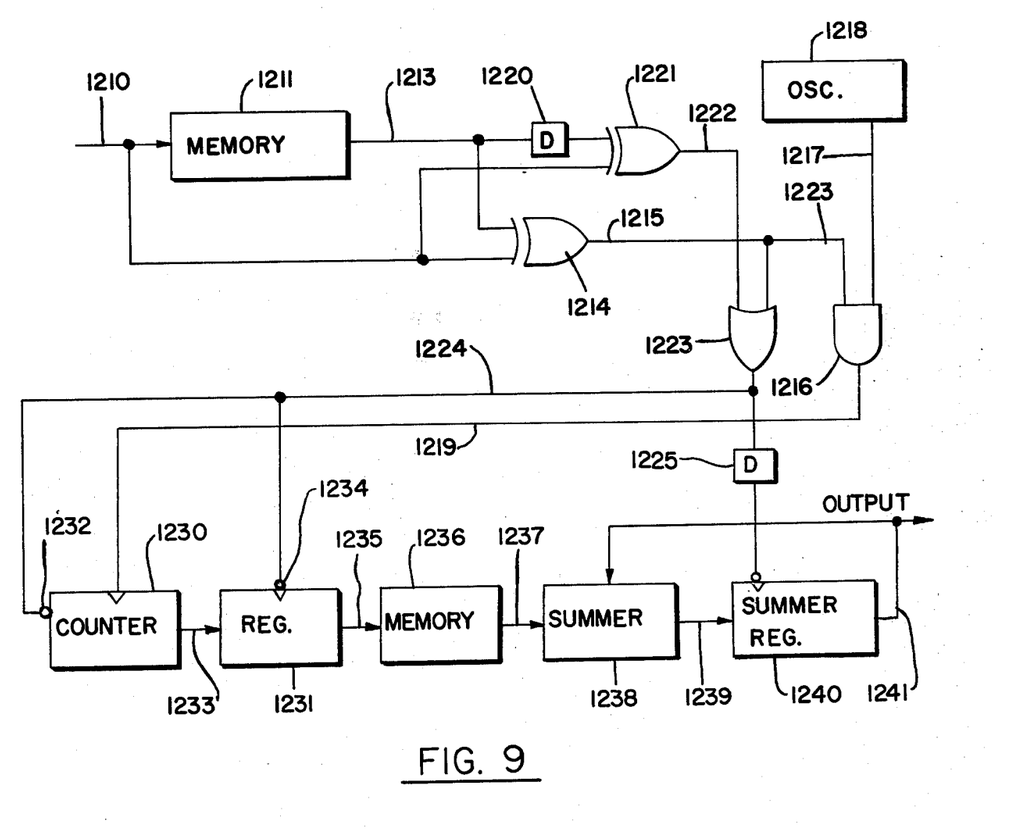
FIG. 9 illustrates a functional block diagram for determining projected length at various orientations.

A system for measuring perimeter and projected length at any arbitrary orientation of features in a field of view is illustrated in FIG. 9. Intercept information corresponding to scan line intercepts of features in the field of scan, appears as a binary signal on line 1210 from a threshold circuit fed by the television camera imaging the features to be measured, as, for example, threshold circuit 53 in FIG. 3 of U.S. Pat. No. 3,805,028. Intercept information on line 1210, enters a line-to-line memory 1211 thereby delaying the intercept information one full line scan. The output of the line to line memory 1211 together with the intercept information is fed into an EXCLUSIVE OR gate 1214 to produce a pulse which is in the one or high state, whenever line 1210 is in the one state and line 1213 is in the zero or low state, or, alternatively, when line 1213 is in the one state and line 1210 is in the zero state. The output on line 1215 of EXCLUSIVE OR gate 1214 is fed into an AND gate 1216 which receives on its other input, a series of pulses on line 1217 from oscillator 1218. The pulses from AND gate 1216 pass on line 1219 to counter 1230 which counts the number of pulses gated through AND gate 1216 for the duration of any one pulse on line 1215. Thus, the counter 1230 produces a count proportional to the period of the pulse at line 1215. The control signals for counter 1230 are derived from OR gate 1223, which receives line 1215 at one input and at its other input line 1222 from EXCLUSIVE OR gate 1221.

The function of EXCLUSIVE OR gate 1221 is to produce a pulse on simultaneous transitions of the signal on line 1213 and line 1210 by delaying the signals on line 1213 using the delay 1220. Consequently, a single control pulse occurs on line 1224 from OR gate 1223 whenever the boundary of a feature is encountered. The signal of line 1224 causes, through strobe input 1234, the contents of counter 1230 to be strobed into register 1231 at the falling edge of the pulse on line 1224. The signal of line 1224 also causes counter 1230 to be reset through reset terminal 1232 whenever line 1224 goes to zero. Consequently, the count in counter 1230 is strobed into register 1231 with the falling edge of the pulse on line 1224, which occurs after the end of the pulse on line 1215, at which time, through a reset signal from input 1232, counter 1230 is reset. Thus, register 1231 receives through line 1233, from counter 1230 the count value corresponding to the length of pulse on line 1215 and stores this value through control of strobe input 1234 by line 1224. Consequently, the output of register 1231 on line 1235 corresponds to the value of the counter at the end of any given pulse on line 1224. This data passes into random access or read only, word organized memory 1236 such that line 1235 addresses memory 1236. Memory 1236 produces, in response to the input on line 1235 from register 1231, on its output line 1237 the contents of the location addressed by the data on line 1235.

Memory 1236 may be a read only memory or random access memory, and each location of its memory is initially loaded prior to the measurement operation, in the case of perimeter values, with data corresponding to the function $$\sqrt{K^2 N^2 + W^2},$$

where W corresponds to the line spacing of the scan format, N corresponds to the address on line 1235 of the memory location and K is a length constant determined by the scan rate and frequency of oscillator 1218.

Figure 8:
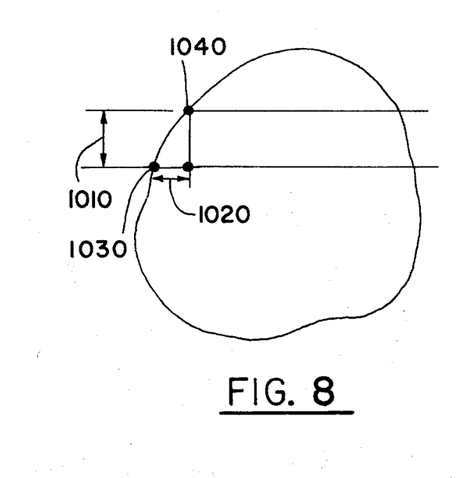
FIG. 8 illustrates a segment of a perimeter measurement on a feature.

In FIG. 8, dimension 1010 corresponds to the line spacing W length units, and the distance between intercept transitions on its successive lines is denoted by distance 1020 corresponding to KN. The perimeter contribution is the distance between points 1030 and 1040, which corresponds to the function stated above.

For any specific feature then, with respect to FIG. 9, it is only necessary to sum the outputs of the memory 1236 on line 1237 in summer 1238 and to pass the result through line 1239 to register 1240. Register 1240 thereby outputs the running total on line 1241 which also passes to the other input of summer 1238 to produce the measurement of perimeter by repeatedly loading register 1240 with the trailing transition of the pulse on line 1224 delayed by delay 1225.

To measure projected length in any direction, memory 1236 may be loaded with the function $$W \sin \theta + KN \cos \theta$$

where W, K and N were defined previously, and $\theta$ is the direction of the dimension of the projected length measurement. Thus, to determine projected length in the vertical direction, the memory 1236 is simply loaded in every location with the value of W.

As already discussed, copending patent application entitled, Image Analysis Indexing Techniques, discloses techniques for extracting index points from an initial field of scan. These index points are correlated to the feature from which they were derived and may correspond, for example, to transitions of the intercepts of the feature or topologically defined points of the feature. FIG. 6B of this application showed how the measurement logic block 110 of FIG. 1A of the last mentioned referenced application may be implemented to perform the tangent to tangent measurements and how the functions of FIG. 1D of that referenced application may, in conjunction with the circuit of FIG. 6B of this application, produce the measurements of Feret's diameter, longest dimension, breadth and convex perimeter.

Likewise, FIG. 6B can also be used to implement the measurements of perimeter and projected length in any orientation. This is implemented by switching switch 6270 to connect the input of arithmetic logic unit 6261 to line 1237 of FIG. 9 hereof.

Thus, during a measurement field of scan, when switch 6270 of FIG. 6B connects line 1237 to the input of arithmetic logic unit 6261, data at that input of the arithmetic logic unit corresponds to the contributions of each scan line interception to the perimeter of the feature to which the scan line interception belongs.

In a previous discussion, it was indicated that the apparatus shown in FIG. 6B could be used in two different ways to produce the desired measurement by measurement processing logic 130 of FIG. 1A of the copending patent application entitled Image Analysis Indexing Apparatus and Methods. The first of these ways involves the use on an initial field of scan and the storing of the coordinate intercept transition points. On the measurement field of scan subsequent to the initial field of scan, memory unit 1236 in conjunction with its preceding electronics delivers on line 1237, via switch 6270, in FIG. 6B, to arithmetic logic unit 6261, data corresponding to the perimeter contributions of each intercept transition in the field of scan. This data is then passed via arithmetic logic unit 6261, under control of controller 6264, to output line 6113, which becomes in FIG. 1A of the last mentioned referenced copending application line 113, which is passed to memory 115 synchronously with the identifying data on line 122 from memory 108.

Consequently, upon the completion of this measurement field, there resides in memory 115, data corresponding to the contribution to the perimeter measurement of each intercept transition in the field of view identified to the specific feature from which it was derived. Consequently, to determine the perimeter of individual features, as set forth in concurrently filed application entitled Image Analysis Indexing Apparatus and Methods, measurement processing logic 130 scans through memory 115 identifying each perimeter contribution to each feature. By considering one feature at a time and scanning through memory 115, selecting each perimeter contribution for that feature and then accumulating the contributions, measurement processing logic 130 accumulates the perimeter measurement for each individual feature which is then passed as the final output on line 140.

In the other mode of operation, the perimeter is determined by using the measurement logic shown in FIG. 6B. An initial field of scan accumulates data on index points at topological points within the field of view. On a subsequent measurement field scan, data representing the individual perimeter contributions of each intercept transition appears on line 1237 and is passed via switch 6270 through arithmetic logic 6261 which under the control of controller 6264 stores in FI/FO memory 6262 a contribution of the intercept. On a subsequent scan line, FI/FO memory 6262 under control of FI/FO memory controller 6263 outputs this data into the arithmetic logic unit 6261 where it is combined with the contributions of perimeter by intercept transitions occurring on subsequent scan lines. Thus, for each feature, arithmetic logic unit 6261, in combination with FI/FO memory 6262, accumulates the perimeter contributions of intercepts on a per feature basis, which data is then outputted on line 113 of FIG. 1A of the cited copending application, entitled Image Analysis Indexing Apparatus and Methods to be received in memory 115 when index pulses, corresponding to the occurrence of index points, appear on line 117. Thus, there resides in memory 115 accumulated perimeter information correlated to each index point together with identification numbers which were loaded into memory 115, along with the perimeter information on line 113.

Throughout the specification specific disclosure and functional operation of the controller 6264 has been presented. The following summarizes part of that disclosure. Controller 6264 corresponds to the controller 264 identified in FIG. 1D of copending patent application for Image Analysis Indexing Apparatus and Methods Serial No. 580,393. Its operation includes control of the data selector 6267 permitting additional count inputs on line 6290, such as those corresponding to the upper positive tangent count of the feature. During a measurement field of scan the controller 6264 causes, on each intercept transition, data on line 6219, representing the tangent value, to appear on line 6113. Consequently, the data of line 6219 is transferred by the arithmetic logic unit 6261 under the control of controller 6264, in response to intercept information on line 611. Additionally, in the measurement field of scan, the controller is used in conjunction with FI FO memory 6262 and FI FO memory control 6263 to determine for each feature in the field of view the minimum tangent value of the leading edge intercepts and the maximum tangent value of the trailing edge intercepts of each feature. Further, data corresponding to perimeter contributions of each intercept transition passes to arithmetic logic unit 6261, which is under the control of controller 6264 and is carried out on output line 6113 for inclusion into memory 115 of the beforementioned copending Image Analysis Indexing technique application. This summarizes in part the operation of the controller 6264.

Measurement processing logic 130 of copending application entitled Image Analysis Indexing Apparatus and methods therefore may scan through memory 115 and collect for each feature all topological points identified with the feature and accumulate the individual parameter contributions of the topological points of each feature.

In a similar manner, projected length measurements obtained by loading other data into memory 1236 of FIG. 9 of this application, may be determined.

An alternative means to measure perimeter is to perform on different measurement fields of scan, projected length measurements at a range of orientations and determine from these the average projected length average for each feature and then multiply the average by $\pi$.

It will be appreciated that the apparatus disclosed herein may also be used for a wide range of other measurements such as area, positional measurements including measurements of centroids and measurements of the coordinates of shapes which escribe features, measurements of intercept lengths and positions, and measurements related to the amplitude of the video signal, such as density.

It is claimed:

1. An image analysis system for measuring an image in a field of view as a function of the relationship of assigned values or points on lines of scan such that points of equal value on separate lines of scan lie in a straight line oriented at a predetermined angle with respect to the lines of scan traversing the field of view, comprising:

means for scanning the image within the field of view to generate a video signal;

means for generating boundary signals as a function of the video signal to define the boundaries of the image;

electronic means for producing a count value in synchronism with the scanning means such that all location points of the scanning spot on each scan line at a specific count value of the electronic means, align at a predetermined angle to the scan lines; and processing means for measuring the image as a function of the count value of the electronic means related to the time of occurrence of the boundary of the image as defined by the boundary signal.

2. An image analysis system as defined in claim 1, wherein the count produced in synchronism with the scanning means is produced solely as a function of the scanning format and is independent of the video signal.

3. The image analysis system for measuring an image in a field of view, as defined in claim 1, wherein the processing means measures the image as a function of two sets of aligned points of value, each set of which lies in a straight line tangential to the image.

4. An image analysis system for measuring objects within a field of scan by scanning the field of scan to produce a video signal as a function of the objects, comprising:

counting means counting in synchronism with the scanning means; and comparison means for comparing the value of the counting means at points within the field of view defined as a function of the video signal.

5. An image analysis measurement system for measuring objects within a field of scan by scanning the field of scan, comprising:

measurement means including two counters, each for counting at predetermined frequencies; and means for presetting one of the counters with the contents of the other counter in synchronism with the scanning means.

6. Image analysis for determining the convex parameters of an object within a field of scan, comprising:

means for measuring at predetermined orientations tangent-to-tangent distances of the object; and means for determining the average of the tangent-to-tangent distances.

7. An image analysis system for measuring the tangent-to-tangent distance of multiple features within a field of scan, comprising:

counting means preset in synchronism with the field of scan for defining an angle of measurement with respect to a line of scan; and measurement means determining the maximum tangent-to-tangent distance determined at the angle of measurement defined by the counting means.

8. An image analysis system for determining the breadth of an object image within a field of scan, comprising:

means for determining the tangent-to-tangent distance of the object image at predetermined orientations to the line of scan; and means for determining the minimum tangent-to-tangent distance.

9. An image analysis system for performing measurements on an object image in a field of scan, comprising:
   a memory;

means for addressing the memory as a function of the video signal generated from the image during the field of scan; and means for accumulating the data generated by the memory in response to the addressing means.

10. The image analysis system as defined in claim 9, wherein the memory is addressed by the addressing means as a function of the time duration of pulses of the video signal.

11. The image analysis system as defined in claim 9 wherein the memory is addressed by the addressing means as a function of the amplitude of the video signal.

12. An image analysis system for performing measurements on an object image in a field of scan, comprising:
   a memory;
   means for addressing the memory as a function of the difference in the time duration of previous scans; and
   means for accumulating the data generated by the memory in response to the addressing means.

13. An image analysis system for performing one of a number of specific measurements on objects in a field of scan, comprising:
   memory means for controlling the specific measurement to be performed by storing data related to the specific measurement and generated as a function of video signals generated as a function of the objects; and
   means for addressing the memory means as a function of the video signal.

14. An image analysis system for generating data as a function of the measurements of perimeter or projected length on objects within a field of scan, comprising:
   means for generating a video signal representing the objects within the field of scan;
   means for delaying the video signal; and
   means for performing an EXCLUSIVE OR operation between the video signal and the delayed video signal.

15. An image analysis system for performing the measurement of the perimeter of an object within a field of scan, comprising:
   means for determining projected length measurements of the object at predetermined orientations to lines of scan; and
   means for determining the average of the projected lengths at the predetermined orientations.

16. An image analysis system for performing measurements cn an object within a field of scan, comprising:
   means for determining projected length measurements at predetermined angular orientations to lines of scan; and
   means for processing the projected length measurements by summing said measurements determined at different orientations to the lines of scan to derive other measurements therefrom.

* * * * *

UNITED STATES PATENT AND TRADEMARK OFFICE
CERTIFICATE OF CORRECTION

PATENT NO. : 4,115,803
DATED : September 19, 1978
INVENTOR(S) : Roger R.A. Morton It is certified that error appears in the above-identified patent and that said Letters Patent are hereby corrected as shown below:

Col. 1, line 58, delete "for" after "within" and substitute therefore --the--;

Col. 11, line 50, after "data" insert --is--;

Col. 12, line 24, after "compare" delete "through line 6265" and substitute therefore --the--; and Col. 15, line 64, after "values" delete "or" and substitute therefore --of--.

Signed and Sealed this

Nineteenth Day of December 1978

[SEAL]

Attest:

RUTH C. MASON
Attesting Officer

DONALD W. BANNER
Commissioner of Patents and Trademarks